(12) United States Patent
Seksaria et al.

(10) Patent No.: US 7,363,750 B2
(45) Date of Patent: Apr. 29, 2008

(54) SLIDING VEHICLE DOOR WITH A MOVEABLE WINDOW ASSEMBLY

(75) Inventors: Dinesh C. Seksaria, Novi, MI (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 448 days.

(21) Appl. No.: 10/976,944

(22) Filed: Oct. 28, 2004

(65) Prior Publication Data

US 2005/0150166 A1    Jul. 14, 2005

Related U.S. Application Data

(63) Continuation-in-part of application No. 10/345,799, filed on Jan. 16, 2003, now Pat. No. 6,968,650, which is a continuation of application No. 09/625,433, filed on Jul. 25, 2000, now Pat. No. 6,508,035.

(51) Int. Cl.
*B60J 5/04* (2006.01)
(52) U.S. Cl. .............................. 49/502; 49/352; 49/349
(58) Field of Classification Search ................. 49/502, 49/352, 349, 348
See application file for complete search history.

(56) References Cited

U.S. PATENT DOCUMENTS

| 1,699,560 | A | * | 1/1929 | Bourgon ...................... 49/502 |
| 4,704,822 | A | | 11/1987 | Srock et al. |
| 4,924,630 | A | | 5/1990 | Lomasney et al. |
| 4,934,099 | A | * | 6/1990 | Maekawa et al. .............. 49/352 |
| 5,001,867 | A | | 3/1991 | Dupuy |
| 5,033,236 | A | * | 7/1991 | Szerdahelyi et al. .......... 49/502 |
| 5,174,066 | A | | 12/1992 | Dupuy |
| 5,226,259 | A | * | 7/1993 | Yamagata et al. ............ 49/502 |
| 5,244,745 | A | | 9/1993 | Seksaria et al. |
| 5,379,553 | A | | 1/1995 | Kimura et al. |
| 5,398,453 | A | | 3/1995 | Heim et al. |
| 5,449,213 | A | * | 9/1995 | Kiley et al. ................... 296/56 |
| 5,469,668 | A | | 11/1995 | Heim et al. |
| 5,787,645 | A | | 8/1998 | Heim et al. |
| 5,857,732 | A | | 1/1999 | Ritchie et al. |
| 5,964,063 | A | | 10/1999 | Hisano et al. |
| 5,987,821 | A | | 11/1999 | Heim et al. |
| 6,015,182 | A | | 1/2000 | Weissert et al. |
| 6,039,384 | A | | 3/2000 | Schulte et al. |
| 6,086,139 | A | | 7/2000 | Heim et al. |
| 6,106,005 | A | | 8/2000 | Heinz et al. |
| 6,223,472 | B1 | * | 5/2001 | Ishikawa et al. .............. 49/502 |

(Continued)

FOREIGN PATENT DOCUMENTS

EP    0286923    10/1988

(Continued)

*Primary Examiner*—Gregory J. Strimbu
(74) *Attorney, Agent, or Firm*—Peter J. Borghetti; Greenberg Traurig LLP (57) ABSTRACT

A sliding door for vehicles including a space frame formed from a U-shaped extruded aluminum tube and a crossbeam to which inner and outer aluminum door panels are attached. Hardware for operation of the door is mounted on the exposed inside surface of the door. The overall weight of the door is about 20 pounds and the door is about 35 mm thick. A movable window assembly for such a door and a method of making are also disclosed.

6 Claims, 11 Drawing Sheets

U.S. PATENT DOCUMENTS

| | | |
|---|---|---|
| 6,308,999 B1 | 10/2001 | Tan et al. |
| 6,449,907 B2 * | 9/2002 | Nishikawa et al. ............ 49/502 |
| 6,508,035 B1 | 1/2003 | Seksaria et al. |
| 6,536,832 B1 | 3/2003 | Grimm et al. |
| 6,546,674 B1 | 4/2003 | Emerling et al. |
| 6,560,929 B1 * | 5/2003 | Staser et al. ................... 49/362 |
| 6,640,497 B2 * | 11/2003 | Sakaguchi et al. ............. 49/352 |
| 6,655,092 B2 * | 12/2003 | Pacella et al. ................. 49/506 |
| 6,719,355 B2 * | 4/2004 | Ornig et al. .............. 296/146.5 |
| 6,776,449 B2 * | 8/2004 | Komatsu et al. ......... 296/146.5 |
| 7,010,884 B2 * | 3/2006 | Yamamoto ................... 49/352 |
| 7,051,479 B2 * | 5/2006 | Chonavel et al. ............. 49/506 |
| 2003/0101656 A1 | 6/2003 | Seksaria et al. |
| 2004/0049989 A1 * | 3/2004 | Florentin et al. ............. 49/502 |

FOREIGN PATENT DOCUMENTS

| | | |
|---|---|---|
| EP | 0405159 | 1/1991 |
| GB | 2250534 | 6/1992 |
| GB | 2315513 | 2/1998 |
| WO | WO 0208004 | 1/2002 |

* cited by examiner

SLIDING VEHICLE DOOR WITH A MOVEABLE WINDOW ASSEMBLY

RELATED APPLICATION

This application is a continuation-in-part of U.S. application Ser. No. 10/345,799 filed Jan. 16, 2003, now U.S. Pat. No. 6,968,650 entitled "Ultra-Lightweight Thin Sliding Door With Reinforcing Space Frame for a Vehicle" which is a continuation of application Ser. No. 09/625,433 filed Jul. 25, 2000 now U.S. Pat. No. 6,508,035.

FIELD OF THE INVENTION

The present invention relates to sliding doors for vehicles, more particularly to a movable window assembly for use in lightweight aluminum thin sliding vehicle doors with movable glass.

BACKGROUND OF THE INVENTION

Sliding doors are frequently installed in several types of vehicles including passenger vans and, more prominently, minivans. In minivans, the right side passenger door or the right side passenger door and the left side passenger door are slidable in tracks formed in the body of the vehicle. These doors provide access to the passenger compartment of the vehicle via a relatively wide opening.

Sliding doors should seal off the environment such as water, air, and noise. Accordingly, the door structure must be rather rigid and also must meet the safety limitations of the Federal Motor Vehicle Safety Standard (FMVSS214) which requires that the door provide a specified degree of protection from intrusion into the passenger compartment for occupants of the vehicle upon side impact. In order to achieve the strength and stiffness needs for the door and to meet the minimum safety requirements, the doors are typically fashioned from thick and strong components formed from steel. These currently available steel sliding doors are heavy, over about 44 pounds for a DiW (door in white), and relatively thick, typically about 120 mm in cross-section. Lighter weight metals such as aluminum are generally unsuitable for use at this thickness due to manufacturing difficulties. If a steel door were made thinner to reduce its weight, the resulting structural performance would be unacceptable.

An additional drawback to conventional heavy sliding doors is that they are difficult to open and close, especially when the vehicle is parked on a hill, and need a correspondingly heavier mechanism to retain the door in an open position. For smaller individuals, including children, conventional sliding doors are prohibitively difficult to open and close. Some sliding doors are equipped with motors for power operation of the door. Power driven sliding doors overcome some of the difficulties experienced by certain individuals in opening and closing the doors, however the weight of the doors remains problematic for both the power requirement for the door motors and for the overall vehicle weight.

Conventional steel doors are typically manufactured from an inner panel and an outer panel of steel. The steel panels provide structural strength for the door and act as panels for mounting of door hardware as well as serve an ornamental function. The peripheries of each of the inner and outer panels include a U-shaped embossment above the beltline of the door. These embossments are aligned with the openings of the U-shapes facing each other to form a box beam at the periphery of the assembled door. The inner panel and the outer panel are joined together below the beltline along their peripheries with a gap maintained between the inner and outer panels in the central portion of the door. A plurality of tabs integrally formed with the inner panel is bent in a direction away from the inner panel. The ends of the tabs abut the inside surface of the outer panel thereby creating stiffening bridges between the inner panel and the outer panel. The gap between the inner and outer panels is sized to allow for insertion and future maintenance of the door handle and lock hardware between the inner and outer panels of the door and also to provide adequate structural stiffness of the door. Hence, the cross-sectional thickness of a conventional steel door is typically over 120 mm which constrains the use of lighter materials such as aluminum. A further difficulty associated with conventional doors is that the available interior space of the vehicle is diminished by the thickness of the doors.

Numerous components such as the hardware for the door handle and the door lock and stereo speakers are inserted in the gap between the inner and outer panels through cutouts in the inner panel of the door. Hence, the gap between the inner and outer panels must be sufficiently large to accommodate the door hardware and other vehicle accouterments. Installation and maintenance of these components is cumbersome and requires specialized techniques and tools for accessing the gap between the inner and outer panels.

In an attempt to reduce the weight of vehicle body panels, certain body panels have been made from lightweight materials such as aluminum and plastic. For example, U.S. Pat. No. 5,449,213 discloses an aluminum movable liftgate having a tubular frame sandwiched between a pair of inner panels and a pair of outer panels. The frame functions as the load bearing structure for the liftgate, however, there is no provision in the disclosed panel for the hardware or for the contour and other design requirements of a sliding door installed on the side of a vehicle.

Accordingly, a need remains for a thin, lightweight sliding door which maximizes the vehicle interior space and which also allows ready access to the door hardware.

SUMMARY OF THE INVENTION

This need is met by the vehicle sliding door of the present invention. The present invention includes a vehicle door having an inner panel and an outer panel and a space frame. The inner panel, the outer panel and the space frame may be made from a variety of materials including aluminum, steel and plastic, with aluminum being preferred. The inner panel defines a window opening and an outside surface of the inner panel defines a U-shaped channel surrounding a portion of the window opening. The space frame, which primarily carries the structural load in the door, is positioned in the U-shaped channel and includes a hydroformed aluminum tube with a longitudinally extending flange which is fixed to the inner panel. The tube has a U-shaped configuration and extends across the top portion of the inner panel and includes one leg extending to a lower portion of one end of the inner panel and another leg extending to a lower portion of the other end of the inner panel. The space frame further includes an anti-intrusion beam fixed at each end thereof to one of the legs of the tube. The anti-intrusion beam defines a Σ-shaped channel and includes filler material (e.g., foam) positioned within the channel. The inner panel defines an opening which receives a window. The outer panel is fixed to the outside surface of the inner panel at a position below the window opening and an outer valence is mounted on the outside surface of the inner panel at a position above the window opening.

The inner panel inside surface includes one or more depressions with corresponding raised portions, preferably frustoconically shaped, on the inner panel outer surface which are maintained spaced apart from the outer panel via cushioning members. The depressions may be configured to provide packaging clearance for a power door drive motor, door latch mechanisms and the like. A housing carrier is fastened to the inside surface of the inner panel and is configured to receive door hardware such as lock mechanisms. The door further includes at least one bracket mounted to the inner panel inside surface and fixed to the space frame for mounting the door in a vehicle body. The overall cross-sectional thickness of the door is about 35 mm or less.

The present invention further includes a method for manufacturing a vehicle door having the steps of stamping an inner door panel with a window opening and an outer door panel from a sheet of material and assembling a space frame between the inner panel and the outer panel. The step of stamping the inner panel includes forming (i) depressions on the inside surface thereof with corresponding raised portions on the inner panel outside surface and (ii) a U-shaped channel surrounding the window opening. During the stamping process, material from the sheet used to produce the window opening in the inner panel may be used to produce a housing for a door lock hardware carrier. The space frame is preferably formed by bending the tube into a U-shape having a top portion and a pair of legs extending from the top portion, hydroforming the tube with an integrally formed longitudinally extending flange and then mounting an antiintrusion beam at each end thereof to the legs. In assembling the door, the tube is first assembled to the anti-intrusion beam and then seated within the U-shaped channel of the inner panel and the flange of the tube is fixed to the inner panel. The method further includes stamping a valence from a sheet of material and fixing the valence to the inner panel at a position above the window opening. Preferably, the valence and the outer panel are stamped adjacent each other from a single sheet of material.

BRIEF DESCRIPTION OF THE DRAWINGS

A complete understanding of the invention will be obtained from the following description when taken in connection with the accompanying drawing figures wherein like reference characters identify like parts throughout.

DETAILED DESCRIPTION OF PREFERRED EMBODIMENTS

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
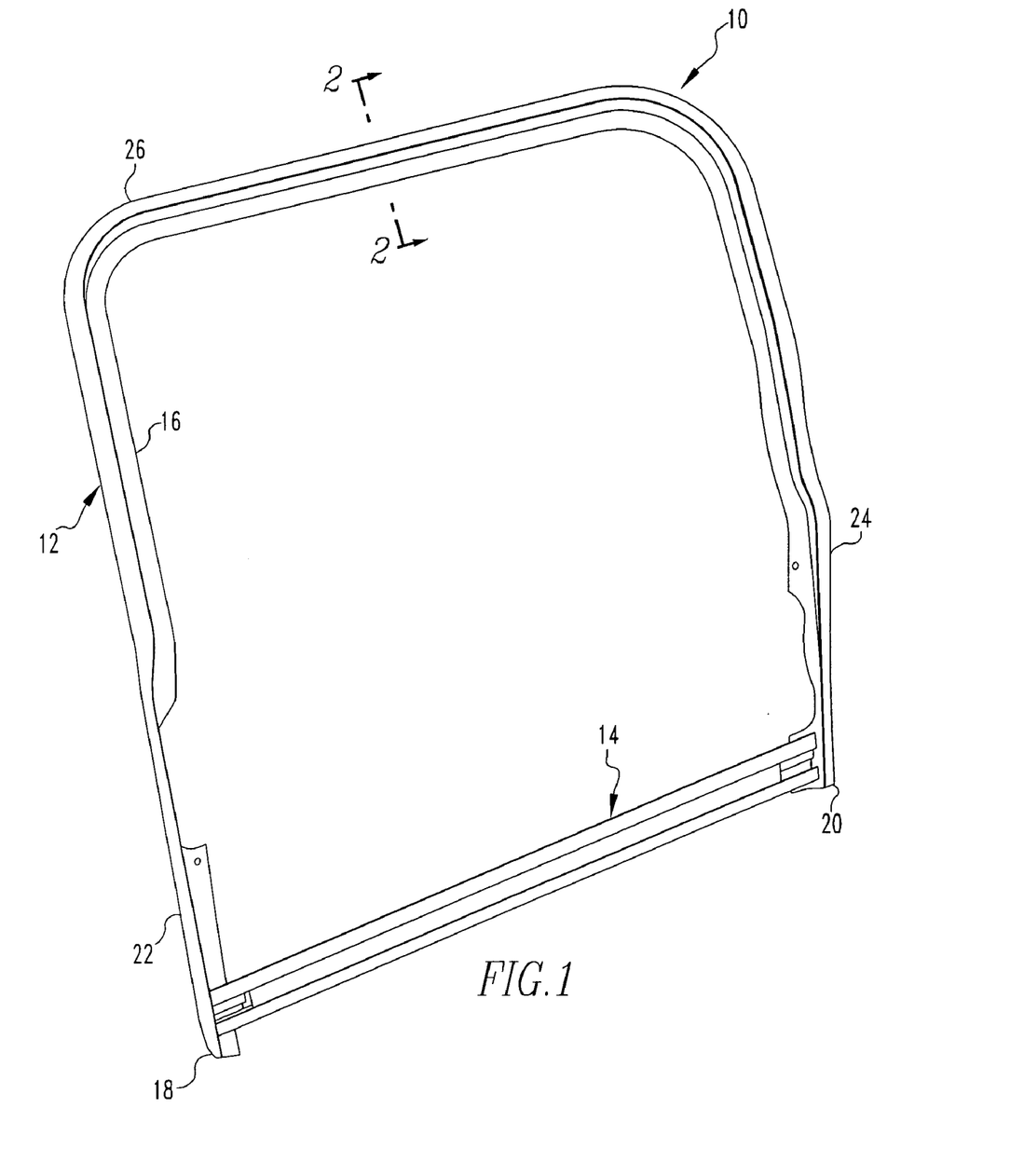
FIG. 1 is a perspective view of a space frame of a vehicle door of the present invention including a hydroformed tube and an anti-intrusion beam.
Figure 8:
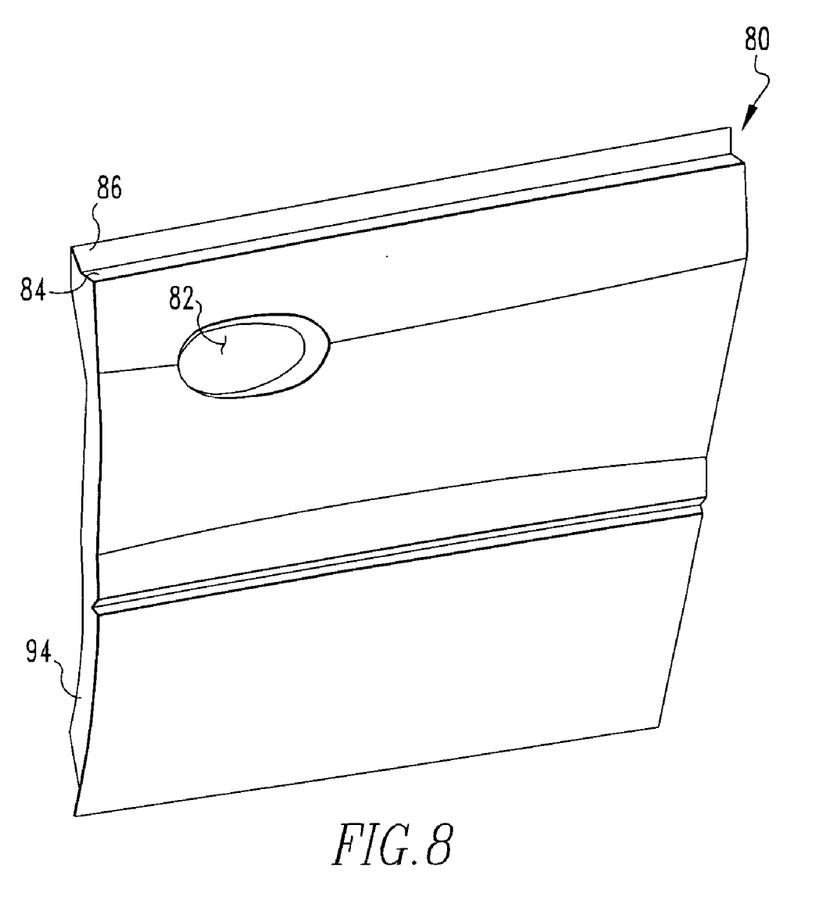
FIG. 8 is a perspective view of the outside surface of the outer panel of the vehicle door of the present invention.
Figure 9:
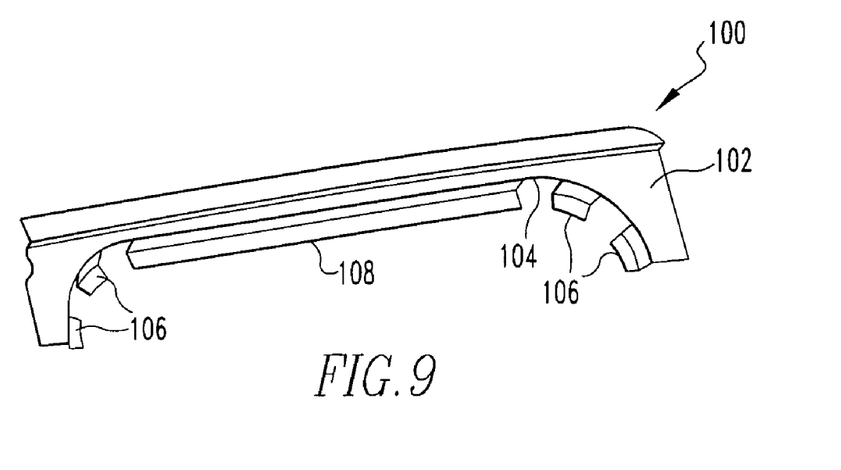
FIG. 9 is a perspective view of the outside surface of the outer valence of the vehicle door of the present invention.

The vehicle sliding door 2 (FIG. 10) of the present invention in its most basic form includes a space frame 10 (FIG. 1) fixed between an inner panel 40 (FIG. 5) and a two-part outer panel member having an outer panel 80 (FIG. 8) and an outer valence 100 (FIG. 9). The door 2 is described hereinafter as being manufactured from aluminum, however, this is not meant to be limiting as other suitable materials including steel and plastic may also be used. The space frame 10 functions as a backbone for the vehicle sliding door 2 and provides the strength and rigidity needed for its use in a vehicle. For convenience, the door 2 of the present invention is described herein for use as a left rear passenger door, however, the invention includes other locations for the door 2 such as a right rear passenger door. By the terms "front" and "rear", it is meant the front direction and rear direction of the door when installed in a vehicle by reference to the front and rear of the vehicle. The door 2 is described herein as a DiW without glazing (a glass window or the like) or dressing.

Figure 2:
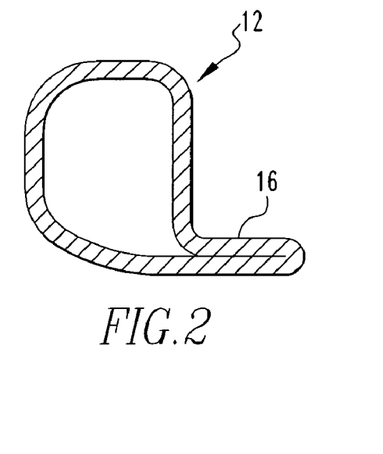
FIG. 2 is a cross-sectional view of the hydroformed tube shown in FIG. 1 taken along line 2-2.

Referring to FIGS. 1-4, the space frame 10 includes a hydroformed aluminum tube 12 and an anti-intrusion beam 14 fixed thereto. The aluminum tube 12 includes a longitudinally extending flange 16. The tube 12 is manufactured in a conventional manner, for example by extruding a fifty-millimeter diameter tube, preferably 1.6 mm wall thickness and bending the extruded tube 12 into a U-shape. The bent tube 12 is then placed in a hydroforming press wherein the tube ends 18 and 20 are sealed, internal pressure is applied and the press is closed to produce the flange 16 and to achieve the cross sectional configuration shown in FIG. 2 as well as the three-dimensional contour of the side of a vehicle. A front leg 22 of the tube is longer than a rear leg 24 of the tube for the reasons detailed hereinafter. The cross-sectional configuration of an upper portion 26 of the tube 12 is shown in FIG. 2. The cross-sectional configuration of the tube 12 and the configuration of the internal void formed thereby are not necessarily constant over the length of the tube 12. At the lower portions of the legs 22 and 24, the cross-sectional configuration is more flattened than that shown in FIG. 2. The anti-intrusion beam 14 extends between the ends 18 and 20 of the tube 12 and is fixed thereto via fasteners (not shown), such as Rivnuts®, extending through holes (not shown) defined in the ends of the flange 16.

Figure 3:
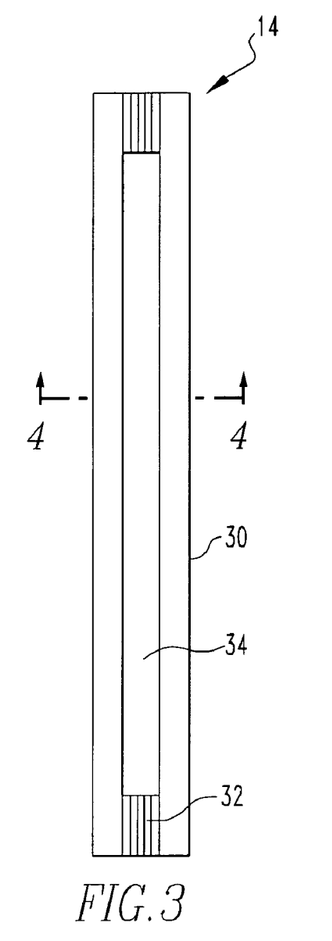
FIG. 3 is a side view of the anti-intrusion beam shown in FIG. 1.
Figure 4:
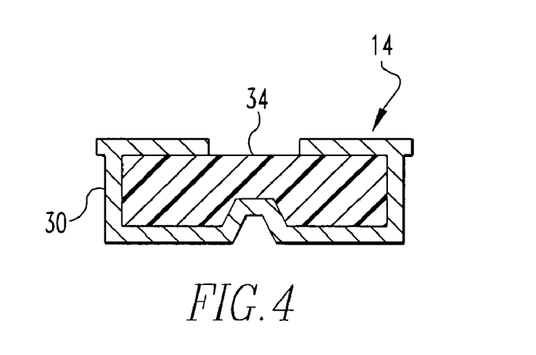
FIG. 4 is a cross-sectional view of the anti-intrusion beam shown in FIG. 1 taken along line 4-4.

Referring to FIGS. 3 and 4, the anti-intrusion beam 14 includes an elongated member 30 having a general Σ-shaped cross-sectional configuration. The Σ-shaped configuration serves to rigidify and strengthen the anti-intrusion beam as disclosed in U.S. Pat. No. 6,308,999, entitled "Multi-Material Hybrid Bumper", incorporated herein by reference. The elongated member 30 preferably is formed from an extruded high strength aluminum alloy such as Aluminum Association alloy 6082-T6 or 6013-T6. The anti-intrusion beam 14 defines an elongated chamber 32 which contains a stiffening and reinforcing material 34. The stiffening and reinforcing material 34 may be virgin or recycled foam or a fiber reinforced material with energy absorbing properties. The stiffening material 34 enhances the rigidity, strength and energy absorbing ability of the anti-intrusion beam 14.

Figure 5:
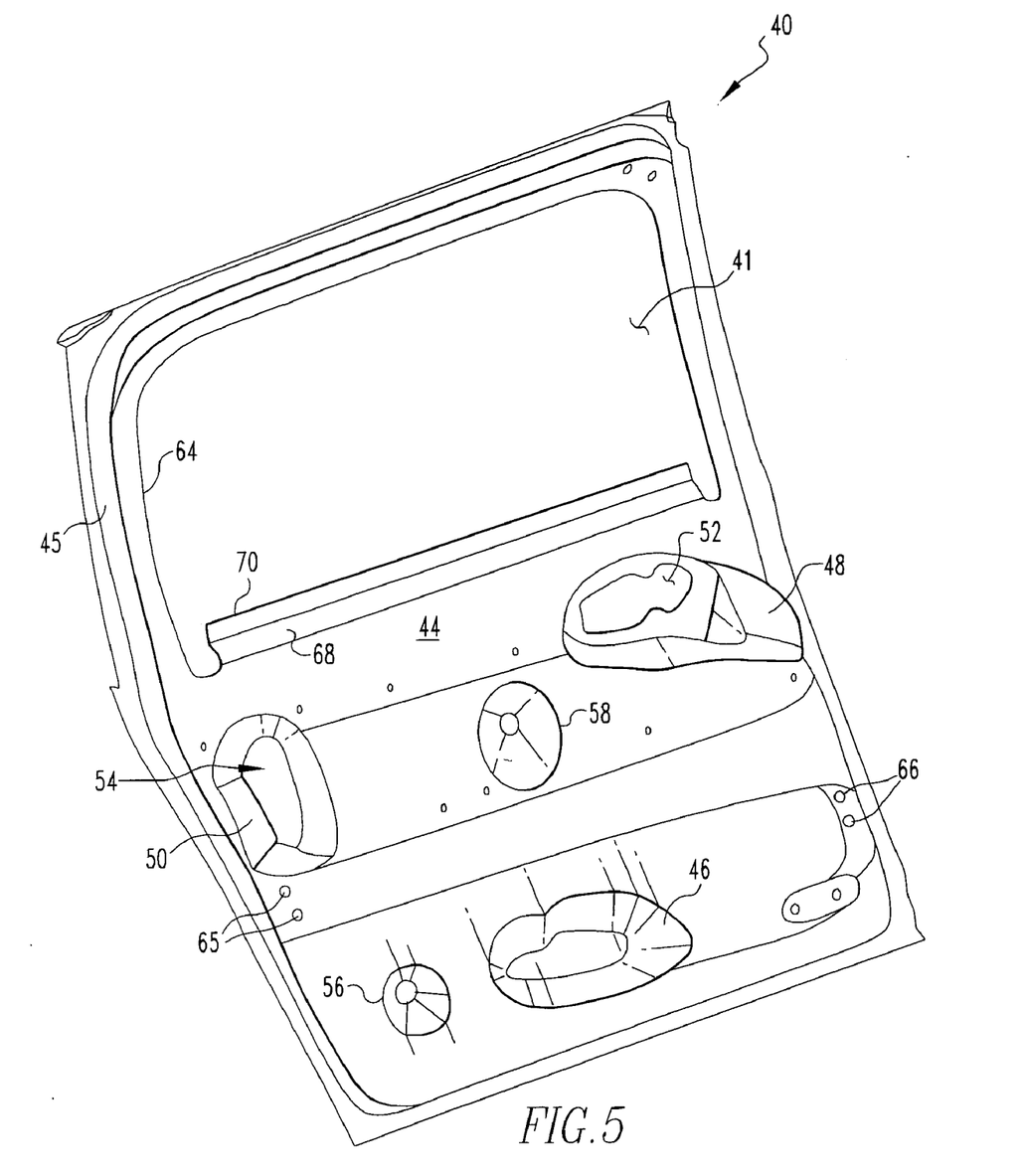
FIG. 5 is a perspective view of the inside surface of an inner panel of the sliding door made in accordance with the present invention.
Figure 6:
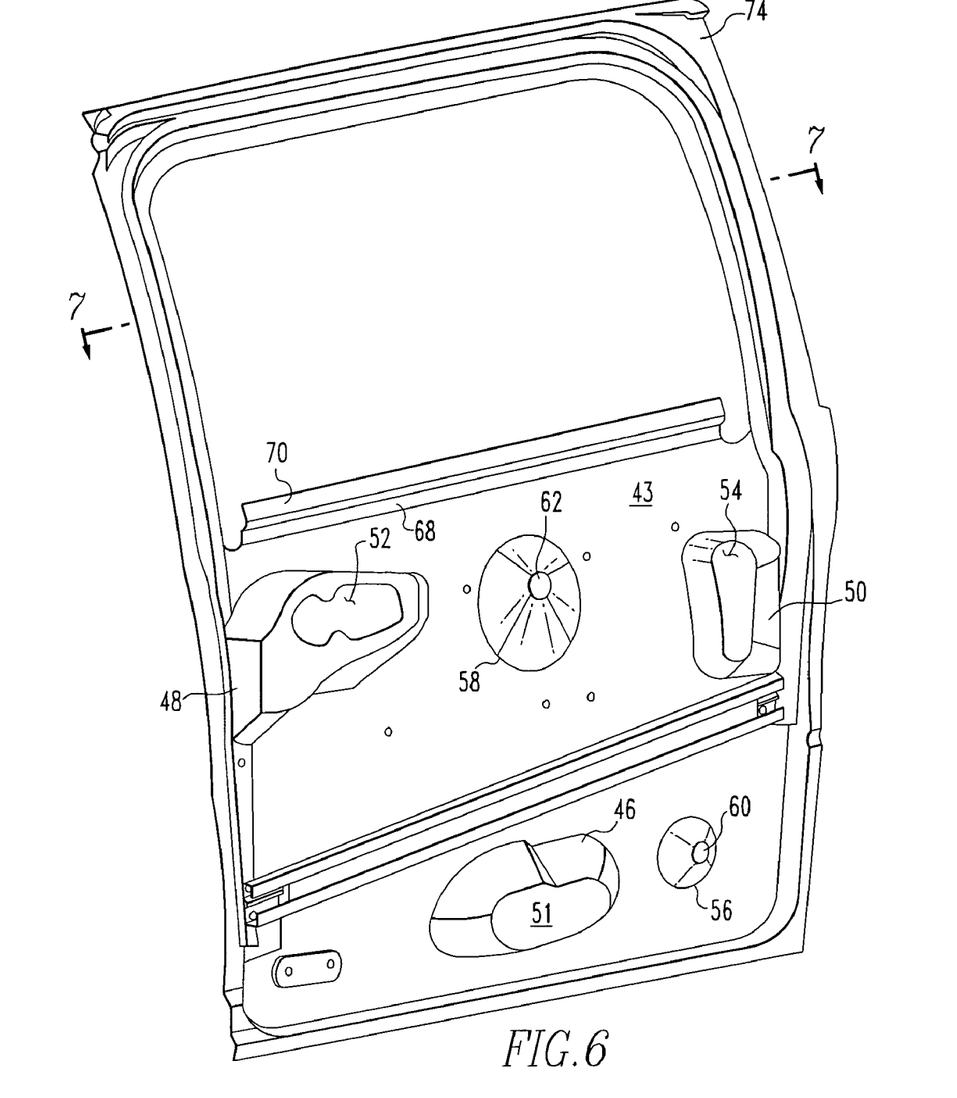
FIG. 6 is a perspective view of the outside surface of the inner panel shown in FIG. 5 with the space frame shown in FIG. 1 attached thereto.
Figure 7:
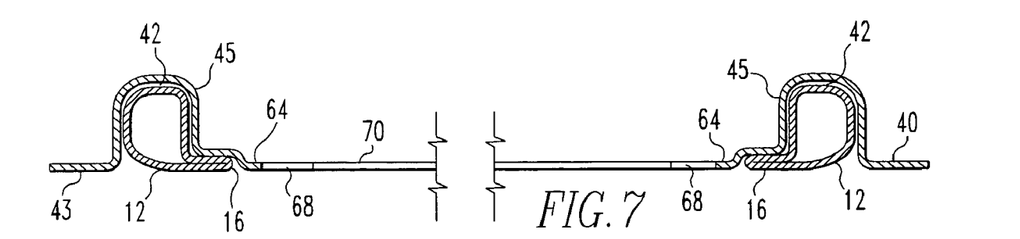
FIG. 7 is a cross section of the inner panel shown in FIG. 6 taken along lines 7-7.

Referring to FIGS. 5-7, the inner panel 40 includes a unitary member formed from a single sheet of aluminum and defining a window opening 41. A U-shaped channel 42 is defined in an outside surface 43 of the inner panel 40 and surrounds three sides of the window opening 41 and extends towards the bottom of the inner panel 40. An inside surface 44 of the inner panel 40 includes a corresponding rib 45. The inside surface 44 of the inner panel 40 further includes a depression 46 sized to receive a motor for moving the vehicle door 2, a depression 48 for receiving door handle hardware and a depression 50 for receiving door lock hardware. Depression 46 includes a flat portion 51 on the outside surface 43 of the inner panel 40. Depression 48 defines an opening 52 in the inner panel 40 so that door handle hardware is accessible from the outside of the door 2. Depression 50 likewise defines an opening 54 in the inner panel 40 to provide access for door lock hardware. The inside surface 44 of the inner panel 40 further includes a pair of depressions 56 and 58 each having a frustoconical shape with respective substantially flat portions 60 and 62 on the outside surface 43 of the inner panel 40. The depressions 56 and 58 are preferably formed in accordance with U.S. Pat. No. 5,244,745 which is incorporated herein by reference. The inner panel 40 may include more than two frustoconical depressions with flat portions fixed to the outer panel 80 via adhesives.

As shown in FIGS. 5 and 7, a flange 64 surrounds three sides of the window opening 41. The tube 12 is received in the channel 42 such that the tube flange 16 seats on an outside surface of the inner panel flange 64. The flange 16 of tube 12 is fixed to the inner panel flange 64, preferably via resistance spot welding. The tube 12 may be fixed to the inner panel 40 at other locations within the channel 42. A plurality of bolt holes 65 and 66 are defined in the inner panel 40 for fixing the anti-intrusion beam 14 thereto. Bolt holes 65 at the rear end of the inner panel 40 are higher than the bolt holes 66 at the front end of the inner panel 40. As shown in FIG. 6, the installed anti-intrusion beam 14 slopes downwardly towards the front end of the door 2. The front end of the anti-intrusion beam 14 is positioned to bear a significant portion of the load of the door 2 in case of a crash and the rear end of the anti-intrusion beam 14 is positioned such that the anti-intrusion beam 14 passes through the hip point of a passenger seated adjacent the door 2 for improved crash protection.

A ledge 68 extends outwardly from the outside surface 43 of the inner panel 40 along a fourth side of the window opening 64 and an integrally formed elongated tab 70 extends upwardly from the ledge 68. The perimeter of the inner panel 40 includes a mating surface 74 to which the outer panel 80, the valence 100 and a window (not shown) are fixed.

Figure 10:
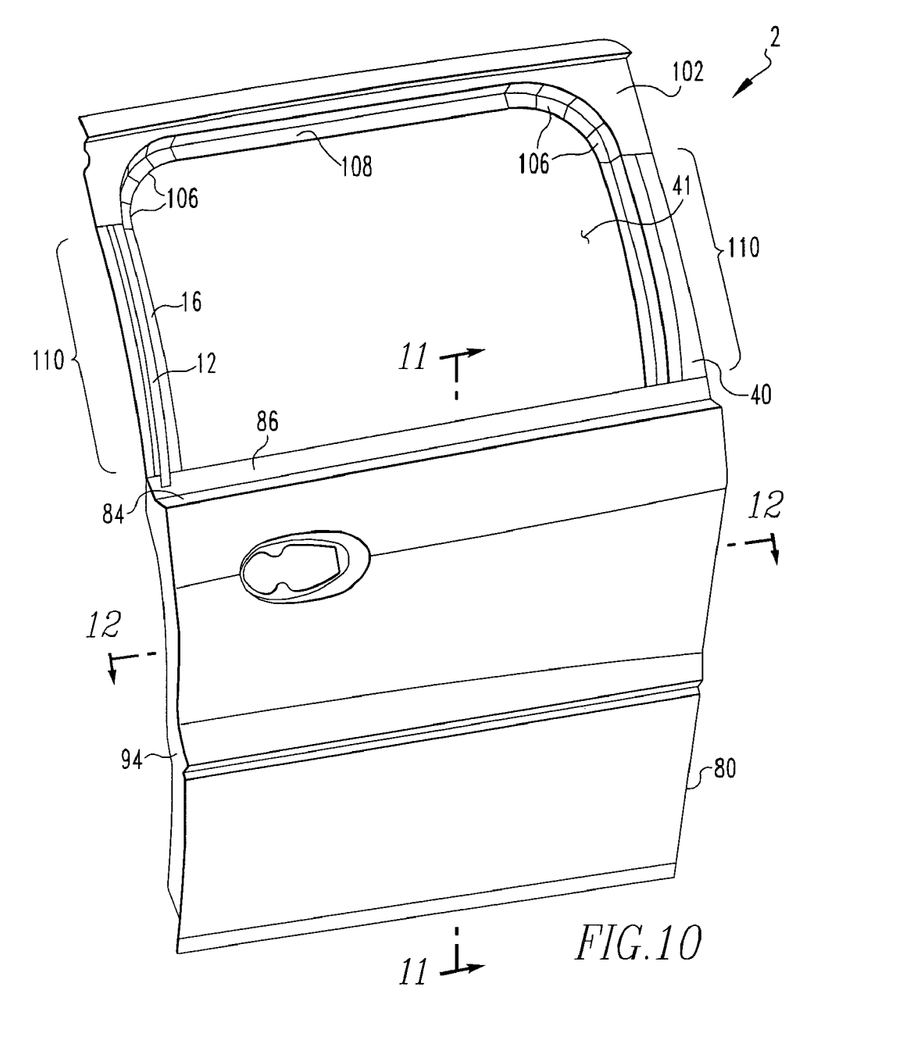
FIG. 10 is a perspective view of the exterior of the assembled door of the present invention.

Referring to FIGS. 8-12, the exterior of the door 2 includes the outer panel 80 and the valence 100. The contour of the outer panel 80 (FIG. 8) is configured in accordance with the ornamental design specifications for the exterior of the vehicle and defines an opening 82 therethrough to receive door handle hardware. A ledge 84 extends inwardly away from an upper edge of the outer panel 80 and an integrally formed elongated tab 86 extends upwardly from the ledge 84. The inner panel tab 70 mates with the tab 86 and are fixed together, preferably via resistance spot welding, such that the openings 52 and 82 are aligned as shown in FIG. 10.

Figure 11:
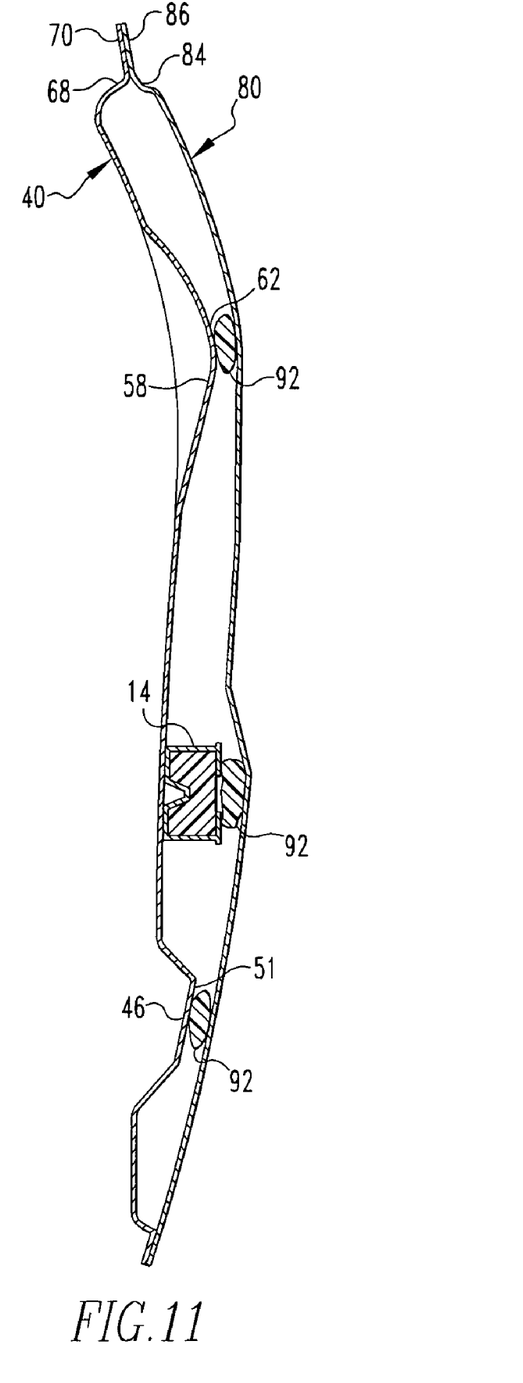
FIG. 11 is a cross section of a portion of the assembled door shown in FIG. 10 taken along line 11-11.

Referring to FIG. 11, the flat portions 51, 60 and 62 of the respective depressions 46, 56 and 58 are spaced apart from an inside surface 90 of the outer panel 80, preferably by about three millimeters, depression 56 not being shown in FIG. 11. The anti-intrusion beam 14 is likewise spaced apart from the outer panel 80, preferably by about three millimeters. Whereas the anti-intrusion beam 14 is relatively stiff, the outer panel 80 is relatively flexible. Accordingly, cushioning between the anti-intrusion beam 14 and the outer panel 80 and between the flat portions 51, 60 and 62 of the inner panel 40 and the outer panel 80 is desirable. The door 2 includes a plurality of cushioning members 92 at these locations where cushioning is desired. Preferably, the cushioning members 92 are manufactured from a foaming adhesive referred to as gumdrops. The gumdrops are applied to one of the surfaces being cushioned, the door components are assembled and the door 2 is painted. The heat applied during the paint curing process causes the gumdrops to expand and fill the void between the surfaces in need of cushioning. After expansion of the gumdrops, the outer panel 80 has a minimal degree of flexibility as determined by a palming test.

Figure 12:
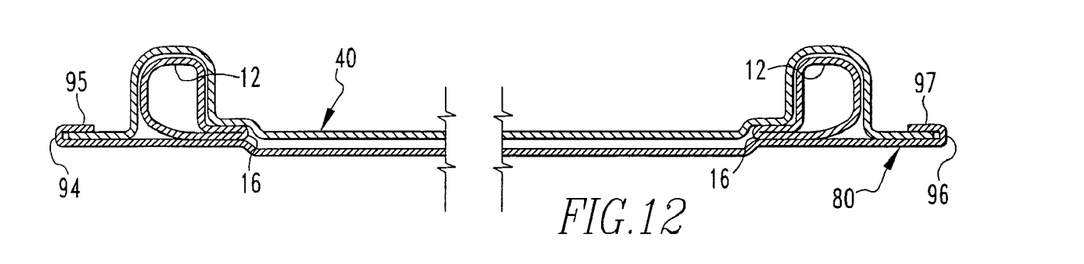
FIG. 12 is cross section of a portion of the assembled door shown in FIG. 10 taken along line 12-12.

Referring to FIGS. 8 and 12, the outer panel 80 includes a front side member 94 with a front hemming member 95 and a rear side member 96 with a rear hemming member 97. The front side member 94 and the rear side member 96 each have a length about equal to the width of the gap between the inner and outer panels 40 and 80. The hemming members 95 and 97 are bent around the peripheral front and rear edges of the inner panel 40 to finish the front and rear edges of the lower portion of the door 2.

Referring to FIGS. 9 and 10, the outer valence 100 is mounted on the upper portion of the inner panel 40 above the window opening 64. The valence 100 includes a substantially planar portion 102 which overlies and abuts the inner panel mating surface 74 and the tube 12 above the window opening 64. The lower edge 104 of the planar portion 102 has a shape corresponding to the shape of the window and preferably is curved. A plurality of first tabs 106 and a second tab 108 are integrally formed with the planar portion 102 and extend from the edge 104. The tabs 106 and 108 are configured to mate with the flange 16 of the tube 12 and are fixed thereto, preferably via resistance spot welding. The relative sizes and positions of tabs 106 and 108 are selected as needed to secure the valence 100 to the integral flange 16 of the space frame 10.

As shown in FIG. 10, portions of the inner panel 40 and portions of the tube 12 are not covered by any outer member as indicated generally at reference numeral 110. In use, glazing such as the glass window (not shown) is installed to cover the window opening 41. The edges of the window overlie the valence tabs 106 and 108, the portions 110 and the outside surface of the outer panel elongated tab 86. The window glass is fixed to the door 2 via adhesives. Preferably, the edges of the window are darkened such that the portions 110 (including the inner panel 40 and the tube 12) are not visible therethrough.

Figure 13:
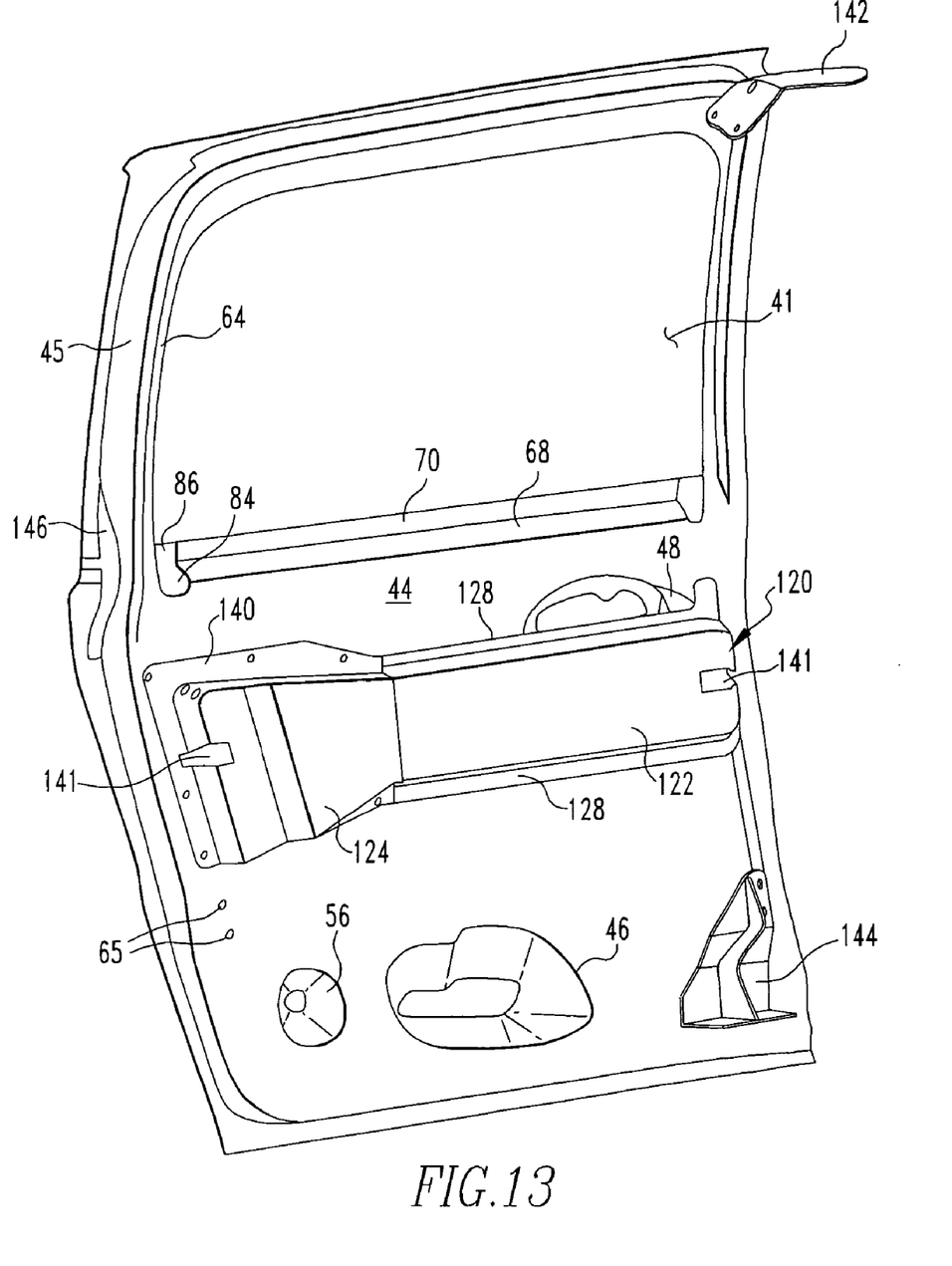
FIG. 13 is a perspective view of the inner panel shown in FIG. 5 including a hardware carrier and mounting brackets.
Figure 14:
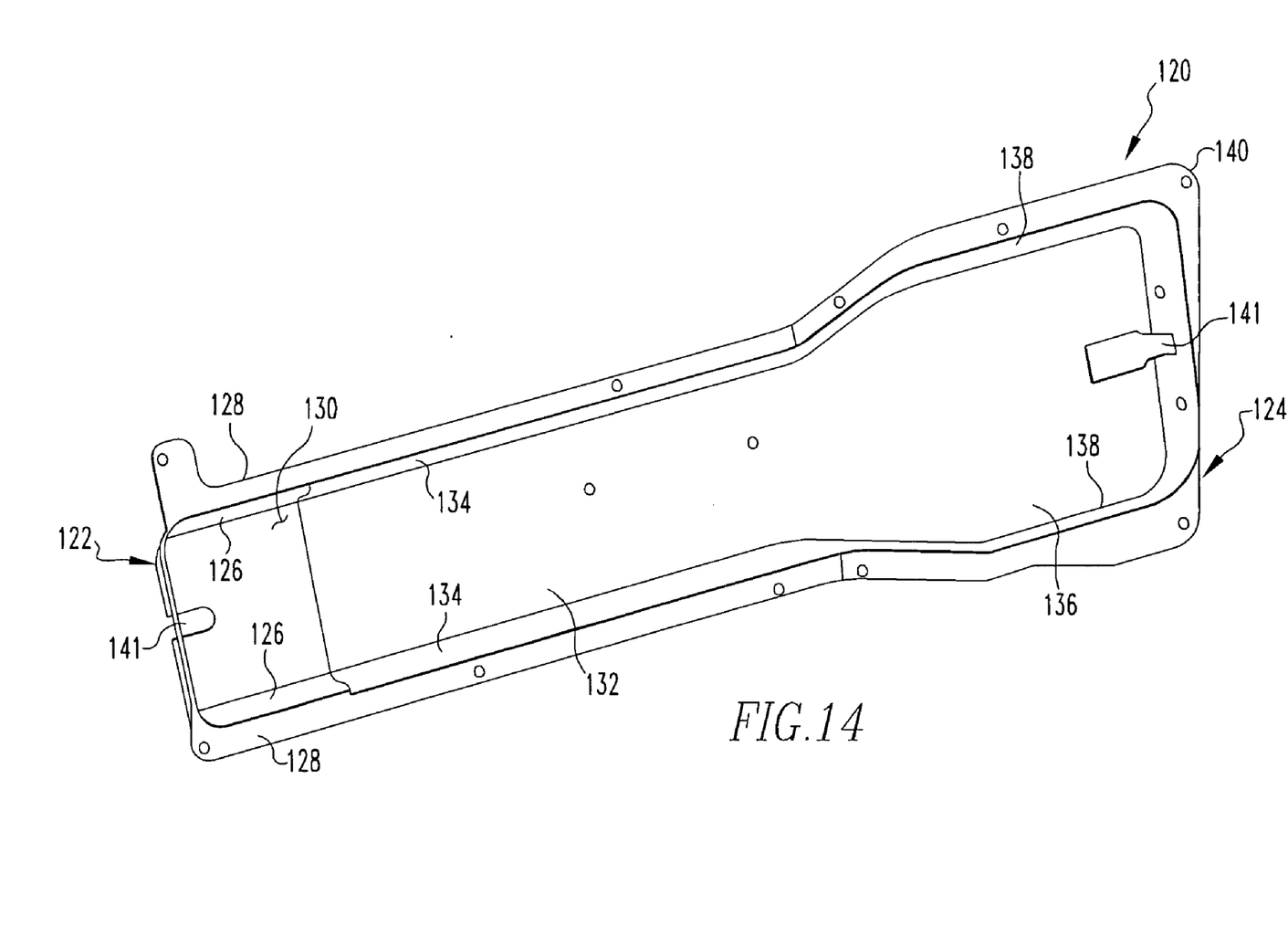
FIG. 14 is a perspective view of the underside of the hardware carrier shown in FIG. 13.

Referring to FIGS. 13 and 14, a hardware carrier 120 is fixed to the inside surface 44 of the inner panel 40. The hardware carrier includes a pair of interengaged housings 122 and 124. Although the present invention is described as having a pair of housings 122 and 124, a single unitary housing is also within the scope of the invention. The pair of housings is contemplated herein for certain manufacturing benefits described hereinafter. Housing 122 includes a pair of opposing walls 126 with integrally formed flanges 128 and defines a channel 130 therebetween. Housing 124 includes an elongated portion 132 which is received within the channel 130 and includes opposing walls 134 which overlie the walls 126 of the first housing 122. Housing 124 further includes an expanded portion 136 having walls 138 and a flange 140. Flanges 128 and 140 are fixed to the inner panel, preferably via fasteners threaded through openings in the inner panel 40 and the hardware carrier 120. The housings 122 and 124 are sized and configured to receive door lock hardware at each end therein. The hardware carrier defines a pair of lock bolt openings 141 through which a lock bolt (not shown) may extend for engagement with corresponding lock hardware on a vehicle. In addition, the hardware carrier also acts as a second anti-intrusion beam for the vehicle door.

FIG. 13 also shows a plurality of brackets 142, 144, and 146 fixed to the inner panel 40. The brackets 142, 144, and 146 each include a plurality of rollers configured to be received in grooves or tracks defined in a vehicle body for guiding movement of the door 2 when opening or closing the door 2. Preferably, each of brackets 142, 144 and 146 is fastened to the tube 12 with bolts or the like extending through the brackets and the inner panel 40 and into the tube 12 with bracket 142 carrying the bulk of the load of the door 2. The brackets 142, 144 and 146 do not require reinforcing members on the inner panel 40 as do the sliding doors of the prior art because the brackets are directly supported by the tube 12. The brackets 142, 144 and 146 may be formed from cast aluminum, magnesium alloys or molded plastic In a preferred embodiment, each of the above described components of the present invention are formed from aluminum with the exception of the foam insert 34 of the anti-intrusion beam 14 and the plastic brackets 142, 144 and/or 146. Accordingly, the weight of a door made in accordance with the present invention is significantly less than a steel sliding door. Typical steel sliding doors weigh on the order of 44 pounds. A door manufactured in accordance with the present invention weighs about 20 to 21 pounds. This is accomplished in part by using relatively thin gauge aluminum sheet for manufacturing the inner and outer panels 40 and 80. The inner and outer panels 40 and 80 and the valence 100 may be formed from aluminum having a thickness of about 0.8 to about 1 mm. Known prior art sliding doors are made from steel that is about 0.7 mm thick. If the conventional design for steel sliding doors were used to produce an aluminum door, the aluminum would need to be about 1.2 to about 1.3 mm thick to achieve the necessary strength. However, the sliding door of the present invention allows for utilization of relatively thin (1 mm or less) aluminum and thereby achieves a significant improvement in the overall weight of the door over the prior art doors. Hence, the vehicle door of the present invention is lightweight and easy to open and close when installed in a vehicle. The lightweight of the door of the present invention also reduces the overall weight of the vehicle and improves the fuel economy for the vehicle.

When the tube 12, the anti-intrusion beam 14, the inner panel 40, the outer panel 80 and the valence 100 are manufactured from aluminum, the door 2 may be about 35 mm thick or less which is significantly thinner than prior vehicle sliding doors. When installed on a vehicle, such a thin door provides more interior space inside the vehicle thereby enhancing the comfort for the vehicle occupants and/or creating additional cargo capacity.

In addition, the vehicle door of the present invention is more easily manufactured, particularly during the mounting of lock and window hardware. All mechanical aspects of the lock may be pre-assembled and mounted to the hardware carrier 120 and are accessible to the inside surface 44 of the inner panel 40. The hardware carrier 120 bearing the lock and window hardware then is readily mounted to the exposed inner panel 40. After assembly of the door 2 including mounting of the hardware carrier 120, the inside surface of the door 2 is preferably covered with a finishing trim panel made of fabric or plastic or the like. This covering material may be readily removed to maintain the lock and door hardware as needed over the life of the vehicle.

Whereas prior art vehicle sliding doors require that the door hardware be inserted into the gap between the assembled inner and outer panels using specialized installation tools and techniques, the door 2 of the present invention allows for pre-assembly and mounting of the lock and window hardware to the hardware carrier. The prior art vehicle sliding doors utilize an inner panel which serves a structural purpose in providing strength to the door and also serves as a skin for retaining the door hardware and other vehicle accouterments within the interior of the door. The door 2 of the present invention includes an inner panel which serves as a mounting surface for door hardware and the like, however, the structural support for the door 2 is provided by the space frame 10. In this manner the two functions of the inner panel of the prior art doors are performed by two distinct components of the door 2 of the present invention.

The present invention further includes a method of manufacturing a sliding door having the steps of 1) stamping an inner panel from a sheet of material, the inner panel having an inside surface and an outside surface; 2) stamping an outer panel from a sheet of material; 3) forming a space frame; and 4) fixing the space frame to the inner panel, thereby placing the space frame between the inner panel and the outer panel. The material preferably comprises aluminum. When the inner panel is stamped, the depressions in the inner panel inside surface, the openings for a window and for a door handle and lock hardware, the U-shaped channel in the outside surface are all formed. Likewise, when the outer panel and the valence are stamped, all of the features described and shown herein are formed.

The door 2 of the present invention uses less material than prior vehicle sliding doors. Conventional steel panels have been stamped from a single sheet of steel in a process that cuts out a window opening. A significant portion of the sheet of steel was wasted in the cut out of the window opening. In the present invention, the material for the outer panel 80 and the valence 100 may be stamped from a single sheet of aluminum wherein the outer panel 80 and the valence 100 are stamped from portions of the sheet adjacent each other without the need to provide a cut out for the window opening. In this manner, the metal which would, according to conventional door manufacturing practices, become scrap material from the window opening cut out, instead is not wasted. Alternatively, the outer panel 80 and the valence 100 may be stamped from separate sheets of aluminum, thereby avoiding the need to provide a cut out for the window opening since the window opening is created when the valence 100 and the outer panel 80 are assembled adjacent the space frame 10.

Similarly, the inner panel 80 and the housings 122 and 124 may be stamped from a single sheet of aluminum. The cut out area of the window opening may be used to produce the housings 122 and 124. The assembled hardware carrier 120 preferably is longer than the window opening, hence the cut out of the window opening generally is too small to produce a unitary housing. However, the housings 122 and 124 may be sized to be stamped from the cut out area of the window opening and then assembled to create the hardware carrier 120. The hardware carrier 120 may be produced from a single piece of metal and not utilize the cut out area of the window opening, however, it is preferred to minimize aluminum scrap by stamping the housings 122 and 124 along with the inner panel 40 as described above.

Figure 15:
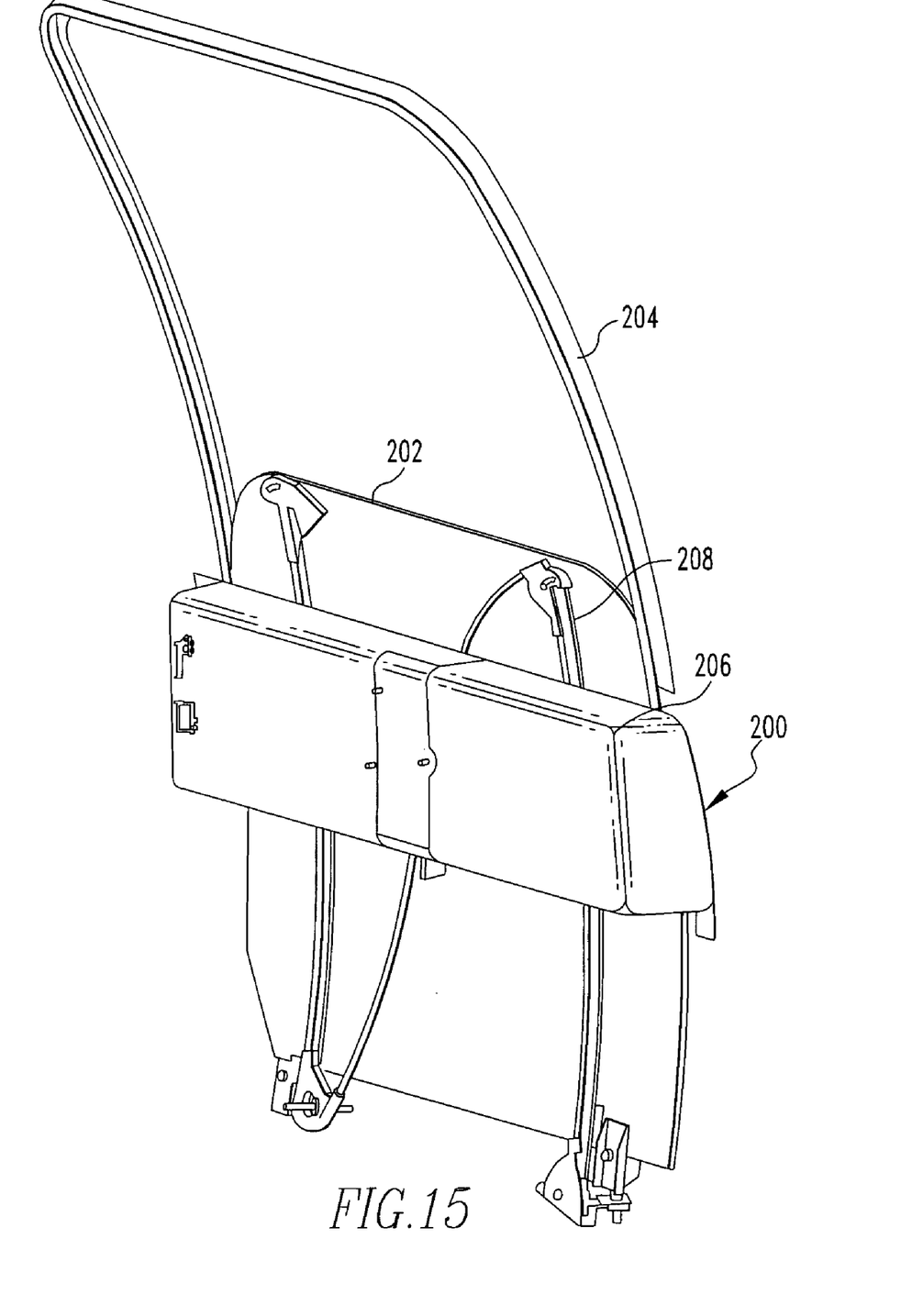
FIG. 15 is a perspective view of the movable window assembly of a vehicle door of the present invention.

Referring to FIG. 15, the vehicle door 2 of the present invention further includes a unique movable window assembly 200. The window assembly 200 includes the glass 202 and seals 204 that are preassembled to the exemplary hardware carrier 206. The seals 204 are made from material comprising rubber or plastic. As discussed hereinbefore, the door hardware carrier 206 comprises mechanical and electrical door assembly components. It will be appreciated that the mechanical components expressly include, but are not limited to lock/latch hardware (228) and the glass movement mechanism 208. Similarly, it will be appreciated that the electrical components expressly include, but are not limited to a window motor (230). The exemplary glass movement mechanism 208 is preferably made from molded plastic components. However, other known or suitable materials including metals, such as aluminum, could be employed. The mechanism 208 can comprise any suitable mechanism used to move the glass 202 up or down or to maintain a position therebetween. Two examples of such mechanisms include a parallel cable system or gear rack (not shown). The carrier 206, thus, contains the machinery needed to open and lock the door 210 (FIG. 16) manually and/or electrically, as well as the components needed to move the glass 202 from full up to full down position and any position therebetween.

In known conventional door designs, the hardware for controlling the movement of the window is contained within the space formed between the inner and outer door panels. However, the present invention provides the hardware carrier 206 including the window glass 202 and seals 204 therefore as a unit which is not inside the door cavity, but rather on the exterior of the door towards the inside of the vehicle (best shown in FIG. 16). Accordingly, access to and maintenance of the components of the unit is much easier in comparison with known door designs because, for example, no specialized tooling is required to fit within the narrow cavity between door panels to access the components for maintenance or replacement thereof.

Figure 16:
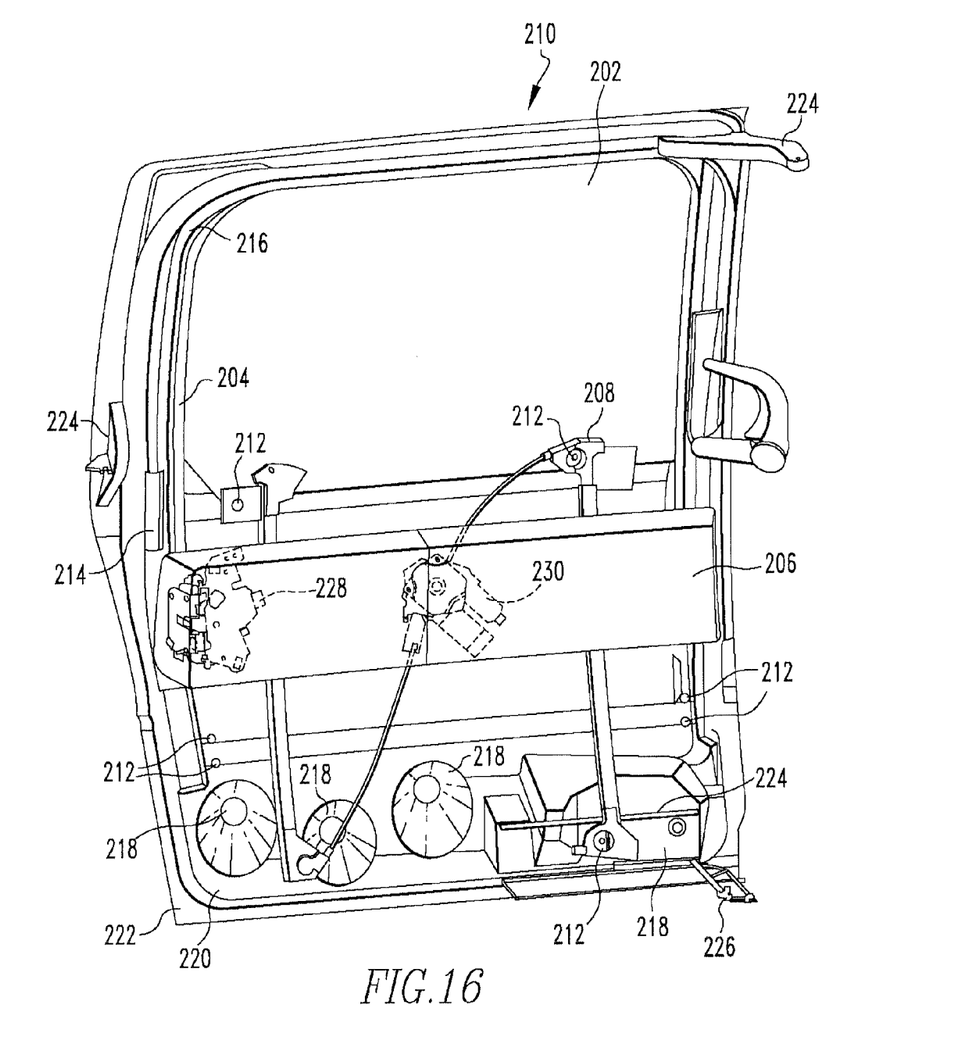
FIG. 16 is a perspective view of the assembled door of the present invention with the movable window assembly in FIG. 15 attached thereto.

Referring now to construction of the exemplary door, after the door assembly (e.g. inner panel, outer panel, and space frame) is painted, the window assembly 200 is coupled to it by a plurality of fasteners, such as the exemplary bolts 212 and snap-in fasteners 214 shown in FIG. 16. Specifically, the bolts 212 and snap-in fasteners 214 secure the window assembly 200 to the space frame 216 and the depressions 218 on the inside surface 220 of the inner panel 222, as shown in FIG. 16. Roller brackets 224 for the top, mid, and lower brackets can be attached via fasteners, such as bolts, to the inner panel 222. It will, however, be appreciated that any known or suitable fastener could be employed. The brackets 224 each include a plurality of rollers configured to be received in grooves or tracks defined in a vehicle body (not shown) for guiding movement of the door when opening or closing the door. The brackets 224 may be formed from cast aluminum, magnesium alloys, molded plastic, or any other known or suitable material. Finally, the wiring harness 226 can be plugged in and inside trim, such as a door liner (not shown), can be attached mechanically (e.g. by fasteners such as screws, clips, or adhesives) (not shown) to the inner panel 222 to provide a finished aesthetically pleasing door. It will be appreciated that although the foregoing design is shown and described herein for a sliding vehicle door, this same approach could be incorporated into a hinged door by replacing the roller brackets 224 used to slide the door in the aforementioned tracks, with appropriately designed hinges (not shown) at one of the sides of the door and the vehicle frame, respectively. The carrier 206 and window mechanism 208 could also be employed with top hinged vehicle doors (not shown), such as the lift gate of a sport utility vehicle, hatchback, or station wagon.

Having described the presently preferred embodiments, it is to be understood that the invention may be otherwise embodied within the scope of the appended claims.

What is claimed is:

1. A vehicle door comprising:

an outer panel having an inner surface adapted to face an interior of a vehicle when the door is mounted to the vehicle;

an inner panel having an inner surface and an outer surface, the outer surface facing the inner surface of the outer panel and the inner surface of the inner panel facing away from the outer panel and adapted to face the interior of the vehicle when the door is mounted to the vehicle, the inner panel defining a window opening having a top and two sides;

a generally U-shaped, tubular space frame structure disposed between the outer and inner panels and partially disposed within the inner panel, the space frame structure extending generally parallel to and above the top of the window opening, the space frame structure extending generally parallel to the sides of the window opening, and the space frame structure having a beam affixed to two ends of the space frame structure;

a movable window assembly comprising a seal having a top extending generally parallel to the top of the window opening, the seal having two sides extending generally parallel to the sides of the window opening, a window pane slidably received by the seal such that the seal guides the window pane as the window pane moves between a closed position wherein the window pane closes the window opening and an open position, and an elongated hardware carrier having a generally U-shaped cross section along a longitudinal axis of the carrier and a generally U-shaped cross section along an axis transverse to the longitudinal axis of the carrier such that the carrier defines a generally U-shaped channel having an opening facing the inner surface of the inner panel, wherein a door lock and a window regulator motor are disposed within the channel of the carrier;

wherein the seal and the carrier are mounted directly on the inner surface of the inner panel; and wherein the inner panel is disposed between the outer panel and the window assembly.

2. The vehicle door of claim 1 wherein the seal is made from a material comprising rubber or plastic.

3. The vehicle door of claim 1 wherein the movable window assembly further comprises mechanical and electrical door assembly components.

4. The vehicle door of claim 3 wherein the mechanical door assembly components comprise a window pane movement mechanism.

5. The vehicle door of claim 4 wherein the window pane movement mechanism is made from material comprising metal or molded plastic components.

6. The vehicle door of claim 5 wherein the metal comprises aluminum.

* * * * *

UNITED STATES PATENT AND TRADEMARK OFFICE
CERTIFICATE OF CORRECTION

| | | |
|---|---|---|
| PATENT NO. | : 7,363,750 B2 | Page 1 of 1 |
| APPLICATION NO. | : 10/976944 | |
| DATED | : April 29, 2008 | |
| INVENTOR(S) | : Dinesh C. Seksaria and John W. Cobes | |

It is certified that error appears in the above-identified patent and that said Letters Patent is hereby corrected as shown below:

In column 5, line 47, after "a", delete "frustocomical" and insert --frustoconical--.

Signed and Sealed this

Fifteenth Day of July, 2008

JON W. DUDAS
*Director of the United States Patent and Trademark Office*